United States Patent
Hongo

(10) Patent No.: US 10,760,994 B2
(45) Date of Patent: Sep. 1, 2020

(54) ABNORMALITY DIAGNOSTIC METHOD FOR FEED AXIS AND ABNORMALITY DIAGNOSTIC DEVICE FOR THE SAME

(71) Applicant: OKUMA CORPORATION, Niwa-Gun (JP)

(72) Inventor: Takumi Hongo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 355 days.

(21) Appl. No.: 15/769,485

(22) PCT Filed: Jul. 19, 2017

(86) PCT No.: PCT/JP2017/026040
§ 371 (c)(1),
(2) Date: Apr. 19, 2018

(87) PCT Pub. No.: WO2018/025634
PCT Pub. Date: Feb. 8, 2018

(65) Prior Publication Data
US 2019/0003924 A1   Jan. 3, 2019

(30) Foreign Application Priority Data
Aug. 5, 2016  (JP) ................. 2016-154748

(51) Int. Cl.
*G01M 13/028*   (2019.01)
*G01M 13/045*   (2019.01)
(Continued)

(52) U.S. Cl.
CPC ...... *G01M 13/028* (2013.01); *F16H 25/2015* (2013.01); *G01M 7/00* (2013.01);
(Continued)

(58) Field of Classification Search
CPC .......... F16H 57/01; G05B 2219/37534; G05B 2219/50182
See application file for complete search history.

(56) References Cited

U.S. PATENT DOCUMENTS 6,116,089 A * 9/2000 El-Ibiary ............. G01H 1/003
73/593
2008/0215292 A1 9/2008 Kato et al.
(Continued)

FOREIGN PATENT DOCUMENTS

JP   H04-062450 A1   2/1992
JP   4112594 B2   7/2008
(Continued)

OTHER PUBLICATIONS

International Search Report and Written Opinion (Application No. PCT/JP2017/026040) dated Oct. 10, 2017.

*Primary Examiner* — Jennifer E Simmons
(74) *Attorney, Agent, or Firm* — Burr & Brown, PLLC

(57) ABSTRACT

It is an object to perform an abnormality diagnosis for a feed axis without additionally adding a sensor or the like. A frequency characteristic of a feed axis and a damage frequency that occurs when the feed axis that has been damaged performs an axis operation are obtained, a frequency where a gain is maximized in the obtained frequency characteristic is calculated, and a feed velocity where the frequency matches the damage frequency is calculated. An axis operation is performed on the feed axis with the calculated feed velocity, and a frequency analysis is performed on servo information regarding a control of a servo motor during the axis operation. Then, the presence and absence of a peak of the damage frequency is confirmed from a result of the frequency analysis, and when the peak is present, it is determined that it is abnormal.

8 Claims, 8 Drawing Sheets

(51) Int. Cl.
  *F16H 25/22* (2006.01)
  *G01M 7/00* (2006.01)
  *F16H 25/20* (2006.01)
  *H02P 29/024* (2016.01)
  *F16H 57/01* (2012.01)

(52) U.S. Cl.
  CPC ....... *G01M 13/045* (2013.01); *H02P 29/0241* (2016.02); *F16H 25/2204* (2013.01); *F16H 57/01* (2013.01)

(56) References Cited

U.S. PATENT DOCUMENTS

| | | |
|---|---|---|
| 2012/0014631 A1 | 1/2012 | Huang et al. |
| 2015/0352679 A1 | 12/2015 | Yamamoto et al. |
| 2015/0369699 A1* | 12/2015 | Chen .................. G01M 13/028 73/593 |

FOREIGN PATENT DOCUMENTS

| | | |
|---|---|---|
| JP | 2009-068950 A1 | 4/2009 |
| JP | 2009-257806 A1 | 11/2009 |
| JP | 2010-038567 A1 | 2/2010 |
| JP | 2013-257253 A1 | 12/2013 |
| JP | 2014-172107 A1 | 9/2014 |

* cited by examiner

FIG.5

| | BEARING DAMAGE FREQUENCY[Hz] | | |
|---|---|---|---|
| FEED VELOCITY | INNER RACE | OUTER RACE | ROLLING ELEMENT |
| 7500mm/min | 100 | 87 | 93 |
| 20000mm/min | 268 | 231 | 249 |

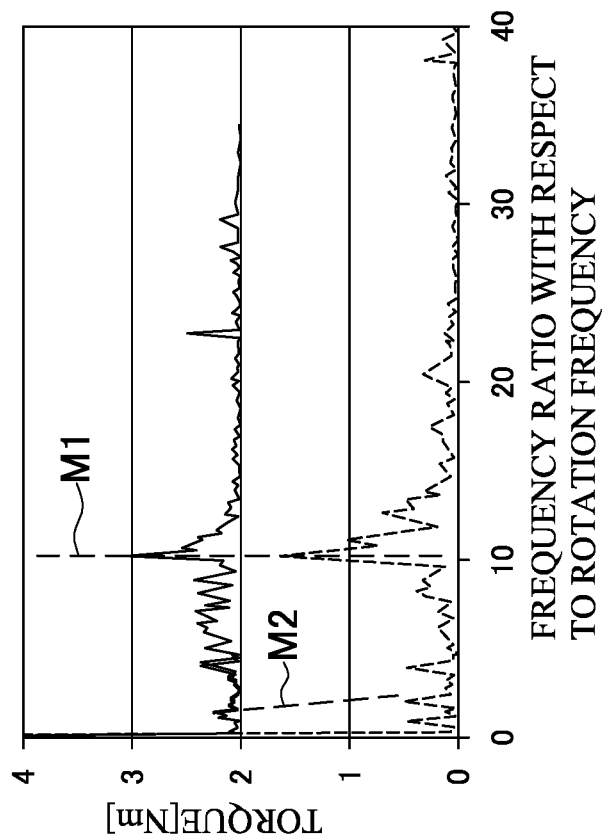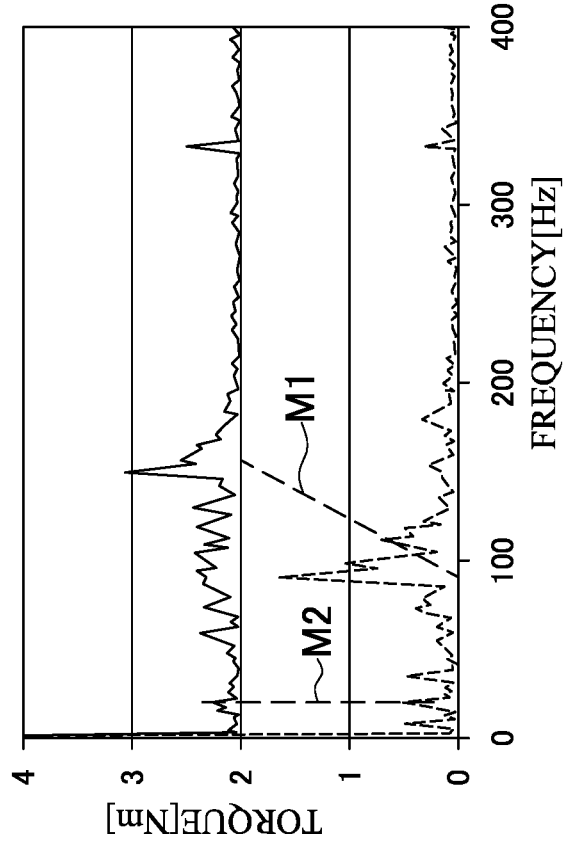

ABNORMALITY DIAGNOSTIC METHOD FOR FEED AXIS AND ABNORMALITY DIAGNOSTIC DEVICE FOR THE SAME

BACKGROUND OF THE INVENTION

This application is the National Stage of International Application No. PCT/JP2017/026040, filed Jul. 19, 2017, which claims the benefit of Japanese Application No. 2016-154748 filed Aug. 5, 2016, the entirety of which is incorporated herein by reference.

Field of the Invention

The disclosure relates to a method and a device that diagnose an abnormality of a feed axis, in a machine such as a machine tool including the feed axis by a ball screw.

Background Art

In a feed axis of a machine tool, a system that transmits rotational motion of a motor to a ball screw for a linear drive is often used. However, in a machine operated for several years, an accuracy failure, an abnormal noise, and the like possibly occur due to a preload loss by abrasion and a damage by entrance of foreign matter, a lubrication failure, or the like. In such a state, a trouble, such as a shape defect, a failure in a pick feed direction, and the like of a workpiece, occurs. Accordingly, it is preferable that machine components such as the ball screw, a bearing, and a linear guide that constitute the feed axis are replaced before deterioration or a damage occurs to generate the trouble.

To know a state of the machine component, it has been proposed that various diagnostic methods such as a method that detects and diagnoses vibration of the ball screw, the bearing, and the linear guide by a vibration sensor, and a method that measures positioning accuracy with a displacement sensor internally disposed. However, in these methods, it is necessary to additionally add a sensor near a site desired to be diagnosed, thus causing a cost increase. Since parts that possibly break down increase, there is also a problem to lead to increase of a breakdown risk.

Therefore, a method that performs the diagnosis using servo information used for control without an additional sensor for diagnosis has been proposed. As a method that determines an abnormality of a reducer, Japanese Patent No. 4112594 proposes a method that performs a frequency analysis on an estimated disturbance value and a torque command in the control to compare spectra in the frequency corresponding to an integral multiple of a rotation frequency of an axis. Japanese Laid-Open Patent Publication No. 2009-68950 proposes a method that, in a machine driven by a motor, performs Fourier transformation on a torque command value, obtains and indicates a spectrum, and focuses on the number of rotations when the motor is rotating and a spectrum in a higher mode caused by the number of rotations to confirm a damage of the machine.

SUMMARY OF THE INVENTION

Problems to be Solved by the Invention

In the feed axis by the ball screw, there are a plurality of driving parts such as the ball screw, the bearing, and the linear guide, and there are also a wide range of states of the breakdown such as the abrasion and the damage. The aforementioned diagnostic method focuses on the motor rotation or the spectrum in the higher mode of the motor rotation to detect the degradation in deflection in the rotation. That is, the degradation in the deflection in the rotation occurs caused by the abrasion of the ball screw and the bearing, or a severe damage roughly equivalent to an abrasion state where most of a transferring surface is damaged, in the machine in a normal state where there is no assembly failure and no accuracy failure of the parts. However, in consideration of processing accuracy required for a machine tool, to perform preventive maintenance, it is preferred to ensure detection of a mild damage before the degradation in the deflection in the rotation.

Therefore, the disclosure has been made in view of such problems, and provides a method and a device that perform an abnormality diagnosis of a feed axis such as a bearing, a ball screw, and a linear guide, without additionally adding a sensor or the like.

Solutions to the Problems

In order to achieve the above-described object, one aspect of the disclosure is an abnormality diagnostic method for feed axis, in a machine including a feed axis that moves a moving body via a ball screw that rotates by a servo motor. The method performs a frequency obtaining step of obtaining a frequency characteristic of the feed axis and a damage frequency that occurs when the feed axis that has been damaged performs an axis operation, a feed velocity calculating step of calculating a feed velocity configured to detect a peak of the damage frequency, from the obtained frequency characteristic, an axis operation step of performing the axis operation on the feed axis with the calculated feed velocity, a frequency analysis step of performing a frequency analysis on servo information regarding a control of the servo motor during the axis operation, and a determining step of confirming the presence and absence of the peak of the damage frequency from a result of the frequency analysis to determine the abnormality when the peak is present.

It is preferable that in the feed velocity calculating step, as the feed velocity, a feed velocity is calculated such that a frequency where a gain is maximized in the obtained frequency characteristic matches the damage frequency.

It is preferable that in the feed velocity calculating step, as the feed velocity, a feed velocity is calculated such that a maximum value of the damage frequency is included in a frequency band where a gain becomes a certain value or more in the obtained frequency characteristic.

It is preferable that in the feed velocity calculating step, a feed velocity that has a non-integral multiple relationship with the calculated feed velocity is additionally calculated, in the axis operation step, the axis operation is performed on the feed axis with a plurality of the feed velocities, in the frequency analysis step, the frequency analysis is performed on the servo information obtained for the respective feed velocities, and in the determining step, the presence and absence of the peak of the damage frequency is confirmed from a result of the frequency analysis for the respective feed velocities.

It is preferable that an indicating step that, based on the result of the frequency analysis obtained in the frequency analysis step, creates two kinds of graphs, one of which indicates a frequency and the other indicates a frequency ratio with respect to a rotation frequency of the feed axis, and collectively indicates the result of the frequency analysis for the respective feed velocities is additionally performed.

It is preferable that the servo information on which the frequency analysis is performed in the frequency analysis step is a torque waveform.

It is preferable that the servo information on which the frequency analysis is performed in the frequency analysis step is a position deviation between a position command to the feed axis and a current position of the servo motor when the damage frequency is less than a predetermined value, and is a torque waveform when the damage frequency is the predetermined value or more.

In order to achieve the above-described object, another aspect of the disclosure is an abnormality diagnostic device for feed axis, in a machine including a feed axis that moves a moving body via a ball screw that rotates by a servo motor. The device includes a storing means that stores a frequency characteristic of the feed axis and a damage frequency that occurs when the feed axis that has been damaged performs an axis operation, a feed velocity calculating means that calculates a feed velocity configured to detect a peak of the damage frequency from the stored frequency characteristic, an axis operation performing means that performs the axis operation on the feed axis with the calculated feed velocity, a frequency analysis means that performs a frequency analysis on servo information regarding a control of the servo motor during the axis operation, and a determining means that confirms the presence and absence of the peak of the damage frequency from a result of the frequency analysis to determine the abnormality when the peak is present.

Effects of the Invention

With the disclosure, without additionally adding the sensor or the like, the abnormality diagnosis for the feed axis such as the bearing, the ball screw, and the linear guide is allowed at low cost.

BRIEF DESCRIPTION OF THE DRAWINGS

FIG. 5 is a view illustrating a damage frequency of a bearing.

FIGS. 8A and 8B are views illustrating an exemplary result indication when a diagnosis is performed with a plurality of feed velocities, FIG. 8A indicates a frequency, and FIG. 8B indicates a frequency ratio with respect to a rotation frequency.

DETAILED DESCRIPTION OF THE INVENTION

The following describes embodiments of the disclosure based on the drawings.

First, an embodiment 1 is described below.

Figure 1:
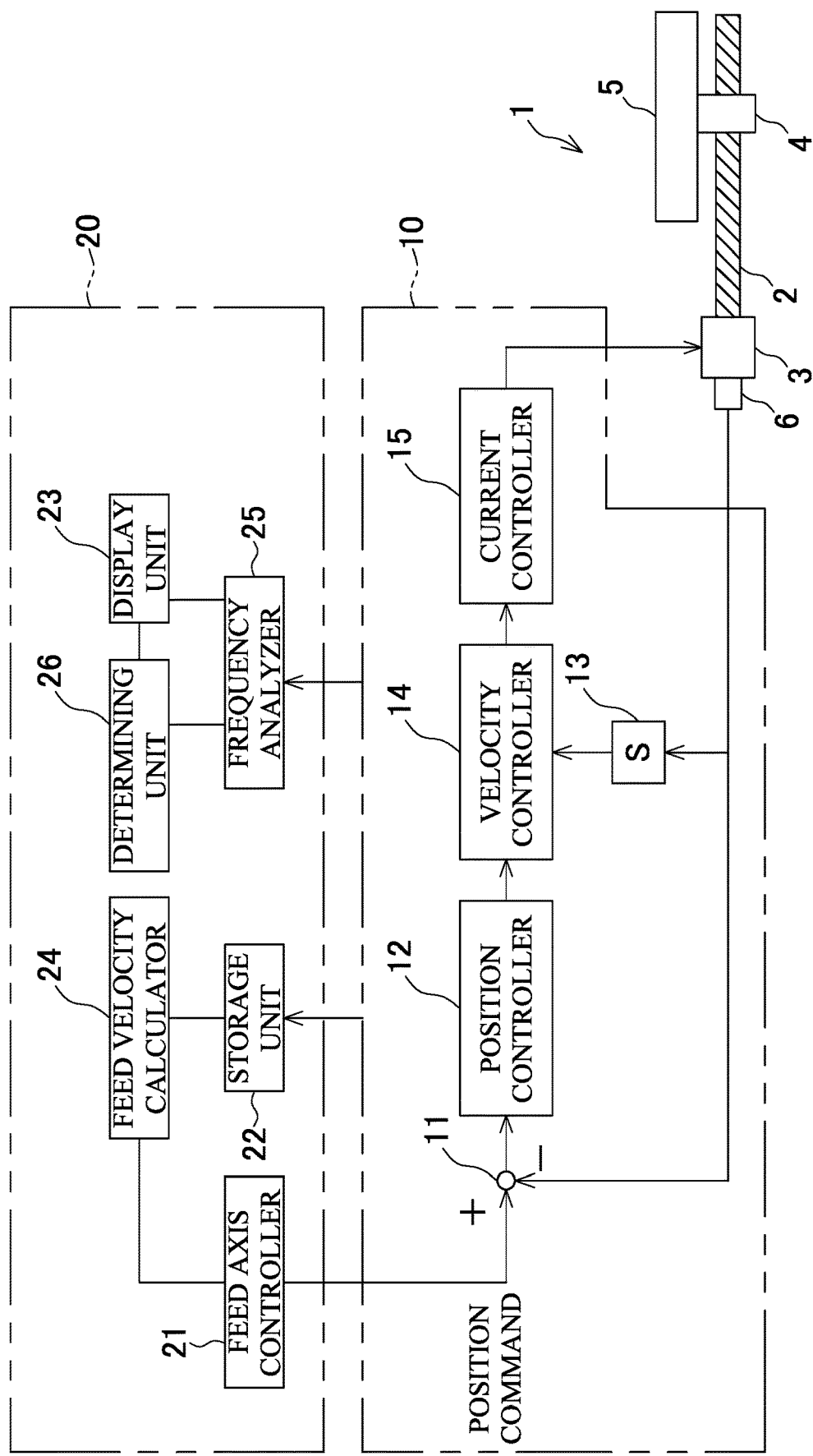
FIG. 1 is a block diagram of a position control unit and an abnormality diagnostic device for a feed axis.

FIG. 1 is a block diagram illustrating exemplary position control unit and abnormality diagnostic device for a feed axis in a machine tool to which the disclosure is applied.

A feed axis 1 in the machine tool includes a ball screw 2 and a moving body 5.

The ball screw 2 is rotatably driven by a servo motor 3 by receiving a position command from a feed axis controller 21 of an abnormality diagnostic device 20 formed in an NC device. The moving body 5 is screwed with the ball screw 2 via a nut 4 to perform a screw feeding movement to an axial direction by the rotation of the ball screw 2. The ball screw 2 has both ends pivotally supported by bearings (not illustrated). Linear movement of the moving body 5 is guided by a linear guide (not illustrated). A position detector 6 is mounted on the servo motor 3.

A position control unit 10 includes an adder 11, a position controller 12, a differentiator 13, a velocity controller 14, and a current controller 15. The adder 11 calculates a position deviation such that a position command from the feed axis controller 21 and a current position from the position detector 6 are input to the adder 11. The position controller 12 generates a speed command value corresponding to the position deviation calculated in the adder 11. The velocity controller 14 generates a torque command value corresponding to the speed command value generated in the position controller 12 and a speed detection value obtained such that the current position from the position detector 6 is calculated in the differentiator 13. The current controller 15 controls current to the servo motor 3 based on the torque command value input from the velocity controller 14. Information used in this position control unit 10, such as the current position detected in the position detector 6, is allowed to be recorded in a storage unit 22 in the abnormality diagnostic device 20, and displayed on a display unit 23.

The abnormality diagnostic device 20 includes a feed velocity calculator 24 which is a feed velocity calculating means that calculates a feed velocity for abnormality diagnosis based on a frequency characteristic and a damage frequency stored in the storage unit 22 as a storing means. The abnormality diagnostic device 20 also includes a frequency analyzer 25 which is a frequency analysis means that performs frequency analysis on the servo information regarding the control of the servo motor 3 obtained from the position control unit 10, when the feed axis controller 21 as an axis operation performing means performs axis operation on the feed axis 1 with the feed velocity calculated in the feed velocity calculator 24. Further, the abnormality diagnostic device 20 includes a determining unit 26 is a determining means that determines presence/absence of abnormality from an analysis result in the frequency analyzer 25.

Figure 2:
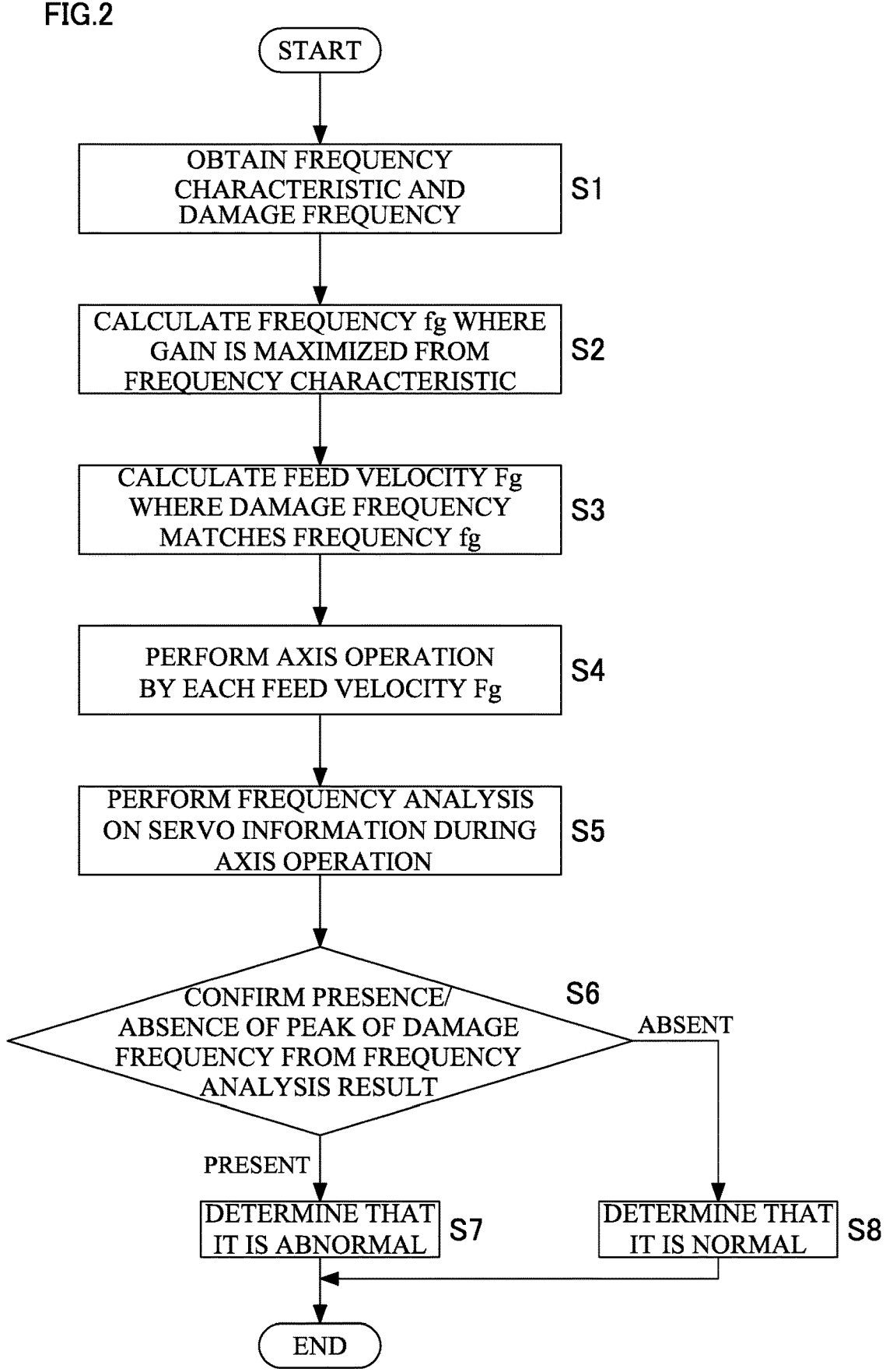
FIG. 2 is a flowchart of an abnormality diagnostic method in an embodiment 1.

When the abnormality diagnostic device 20 receives a command of a diagnostic mode from an operator, the abnormality diagnostic device 20 calculates the feed velocity considering a frequency response characteristic of the feed axis 1, and performs the frequency analysis on the servo information by performing the axis operation on the feed axis 1 with this feed velocity to perform the abnormality diagnosis. The following describes this abnormality diagnostic method based on a flowchart in FIG. 2.

First, the frequency characteristic of the feed axis 1 and the damage frequency of a diagnostic target are obtained to be stored in the storage unit 22 at S1 (a frequency obtaining step). As a method to know the frequency characteristic of the feed axis 1, for example, there is a sweep test that performs velocity input of a sine wave whose frequency continuously varies to confirm an input/output response. However, the frequency characteristic and the damage frequency may be preliminarily stored in the storage unit 22, or may be obtained just before a diagnostic operation.

Figure 3:
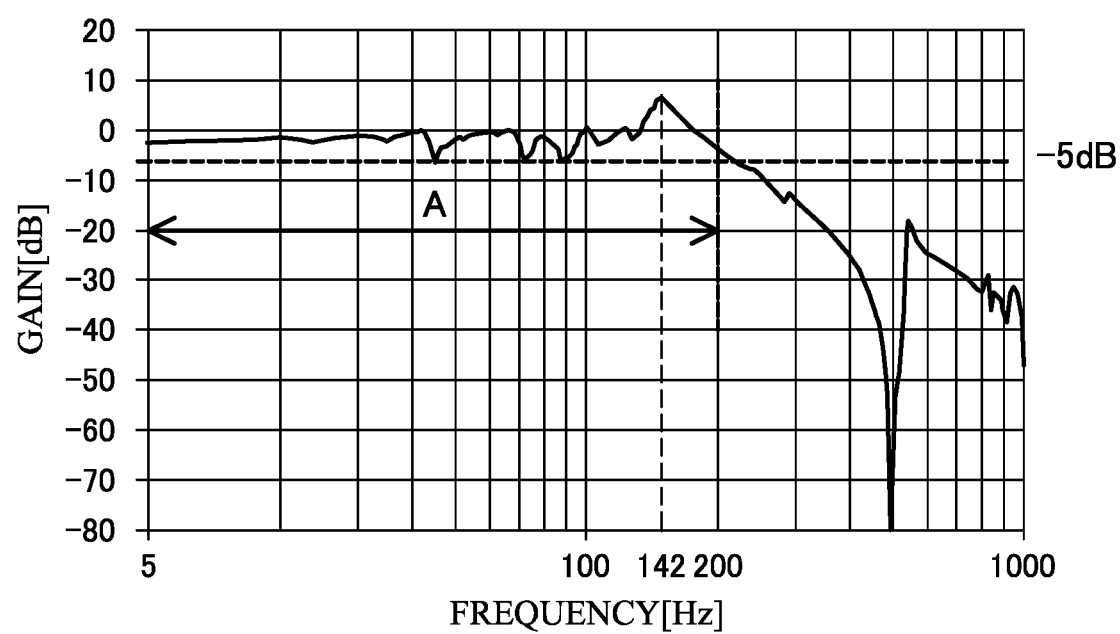
FIG. 3 is a view illustrating an exemplary frequency response characteristic of the feed axis.

FIG. 3 illustrates an exemplary obtained frequency characteristic of the feed axis 1. The horizontal axis indicates a frequency, and the vertical axis indicates a gain with respect to the input.

A frequency of vibration (the damage frequency) that occurs during damage of the machine component such as the bearing, the ball screw, and the linear guide is calculated by a geometrical formula. For example, in the damage of the bearing, the frequency of vibration (the damage frequency) is calculated by following expressions (1) to (3) for each of an inner race (the damage on a race face), an outer race (the damage on the race face), and a rolling element (the damage on a surface). The damage of the ball screw and the damage of the nut can be obtained from a formula similar to that of the bearing, and the damage of the linear guide can be obtained from a pitch of the rolling element.

[Formula 1]

$$\text{Frequency of Inner-Race Damage: } f_{in} = \frac{Z \cdot f_r}{2}\left(1 + \frac{d}{D}\cos\alpha\right) \quad \text{Expression (1)}$$

$$\text{Frequency of Outer-Race Damage: } f_{out} = \frac{Z \cdot f_r}{2}\left(1 - \frac{d}{D}\cos\alpha\right) \quad \text{Expression (2)}$$

$$\text{Frequency of Rolling-Element Damage: } f_{ball} = \frac{f_r \cdot D}{2}\left[1 - \left(\frac{d}{D}\right)^2 \cos^2\alpha\right] \quad \text{Expression (3)}$$

$f_{in}$: frequency by the inner-race damage [Hz], $f_{out}$: frequency by the outer-race damage [Hz],
$f_{ball}$: frequency by the rolling-element damage [Hz],
$f_r$: rotation frequency [Hz], D: bearing pitch diameter [mm], d: diameter of rolling element [mm],
Z: the number of rolling element, a: contact angle [deg.]

Next, in the feed velocity calculator 24, a frequency fg where the gain is maximized is calculated from the result of the frequency characteristic at S2, and then, a feed velocity Fg where each damage frequency matches the frequency fg where this gain is maximized is calculated at S3 (S2 and S3: a feed velocity calculating step). This feed velocity Fg can be calculated by the rotation frequency fr of the feed axis used in the above-described expression×a lead of the ball screw×60.

Taking the frequency characteristic in FIG. 3 as an example, the frequency fg where the gain is maximized is 142 Hz, and the feed velocity Fg that diagnoses the damage of the bearing is as follows.

Inner Race: 10650 [mm/min]
Outer Race: 12241 [mm/min]
Rolling Element: 11451 [mm/min]

When the frequency characteristic is preliminarily obtained, the feed velocity Fg may be also preliminarily calculated to be stored in the storage unit 22.

Next, the feed axis controller 21 performs the operation of the feed axis 1 with each feed velocity Fg at S4 (an axis operation step), and the frequency analyzer 25 performs the frequency analysis on the servo information (here, a torque waveform) during the axis operation at S5 (a frequency analysis step).

Then, the determining unit 26 determines whether a peak of the damage frequency is present or not from the frequency analysis result at S6 (a determining step).

For presence/absence of this peak, for example, when an absolute value of the damage frequency exceeds a threshold value preliminarily set, it is determined that the peak is present. It can be also determined that the peak is present when the frequency analysis result in a normal state without any damage in the bearing is preliminarily obtained to compare it with this frequency analysis result in the normal period and the difference from the frequency analysis result in the normal state exceeds the threshold value preliminarily set. Since there are different levels of influence in processing depending on damage parts, when these threshold values are set per damage part, damage detect can be more accurately performed.

Thus, when the peak of the damage frequency is confirmed at S6, it is determined that it is abnormal (the damage is present) at S7, and when the peak of the damage frequency is not confirmed, it is determined that it is normal (the damage is not present) at S8, thus displaying the determination result on the display unit 23.

Thus, with the abnormality diagnostic method and device of the feed axis 1 in the above-described embodiment 1, the frequency characteristic and the damage frequency of the feed axis 1 are obtained, the feed velocity Fg that can detect the peak of the damage frequency from the obtained frequency characteristic is calculated, the axis operation is performed on the feed axis 1 with the calculated feed velocity Fg, the frequency analysis is performed on the servo information regarding the control of the servo motor 3 during the axis operation, the presence/absence of the peak of the damage frequency is confirmed from the frequency analysis result, and when the peak is present, it is determined that it is abnormal. Thus, the damage determination of the feed axis such as the bearing, the ball screw, and the linear guide is allowed at low cost without additionally adding the sensor or the like.

In particular, here, since the feed velocity where the frequency where the gain is maximized in the obtained frequency characteristic matches the damage frequency is used as the feed velocity Fg, the presence/absence of the peak of the damage frequency can be clearly detected.

Figure 4:
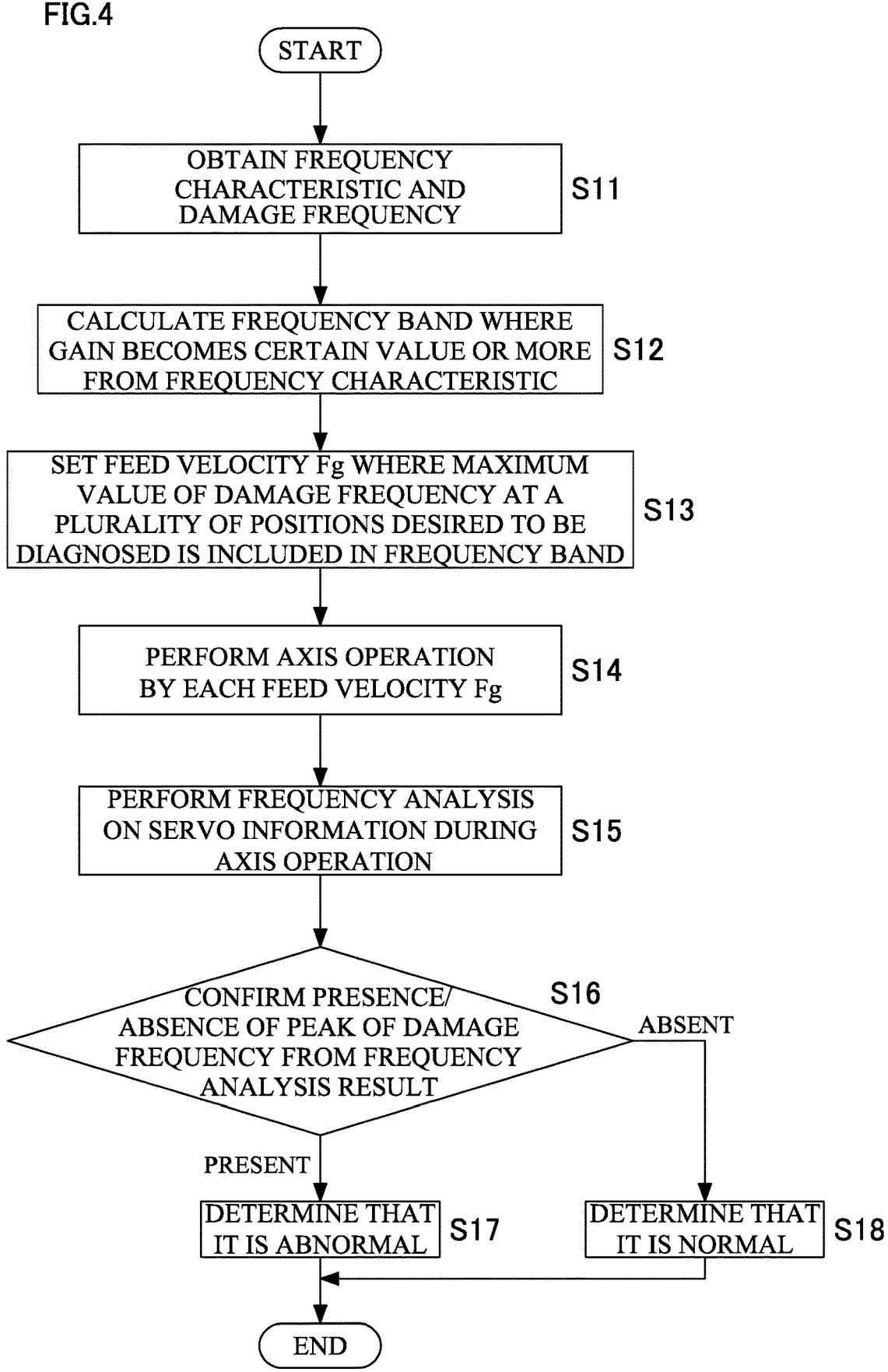
FIG. 4 is a flowchart of an abnormality diagnostic method in an embodiment 2.

In the above-described embodiment 1, the damage regarding the bearing is mainly described as the example. However, detectable damage is wide-ranging, for example, in the ball screw, the nut, and the linear guide. Since a kind of the feed velocity with which the diagnosis is performed increases, a diagnostic period may be relatively longer. The following is an embodiment 2 that decreases the relatively longer diagnostic period. However, since the configurations of the position control unit 10 and the abnormality diagnostic device 20 for the feed axis 1 themselves are similar to those in the embodiment 1, the overlapping description will be omitted. The abnormality diagnostic method by the abnormality diagnostic device 20 will be described based on a flowchart in FIG. 4.

First, the frequency characteristic of the feed axis 1 and the damage frequency of the diagnostic target are obtained to be stored in the storage unit 22 at S11 (a frequency obtaining step). This is similar to that in the embodiment 1.

Next, the feed velocity calculator 24 calculates a frequency band where the gain becomes a certain value or more from the obtained frequency characteristic at S12. Here, in the frequency characteristic in FIG. 3, the gain is set to −5 dB or more, and 5 to 200 Hz is considered as a frequency band A having a good responsiveness.

Next, based on specifications of the bearing, the feed velocity calculator 24 calculates the feed velocity Fg where the maximum value of the damage frequencies at a plurality of positions desired to be diagnosed is included in the frequency band A at S13 (S12 and S13: a feed velocity calculating step). For example, it is considered that the feed velocity is calculated similarly to that in the embodiment 1 for each of the inner race, the outer race, and the rolling element, and the feed velocity Fg is selected from a range of the feed velocity specified by the three feed velocities.

Figure 6:
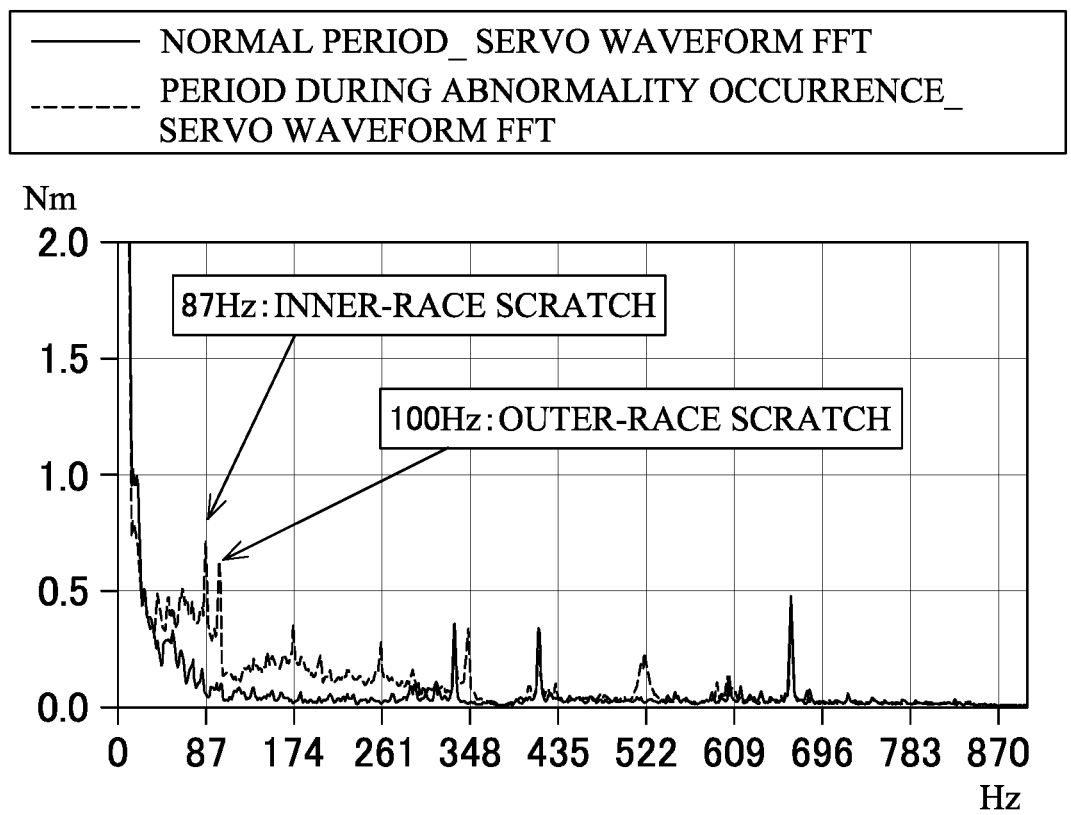
FIG. 6 is a view illustrating an FFT analysis result of a torque waveform when a feed velocity Fg is 7500 [mm/min].
Figure 7:
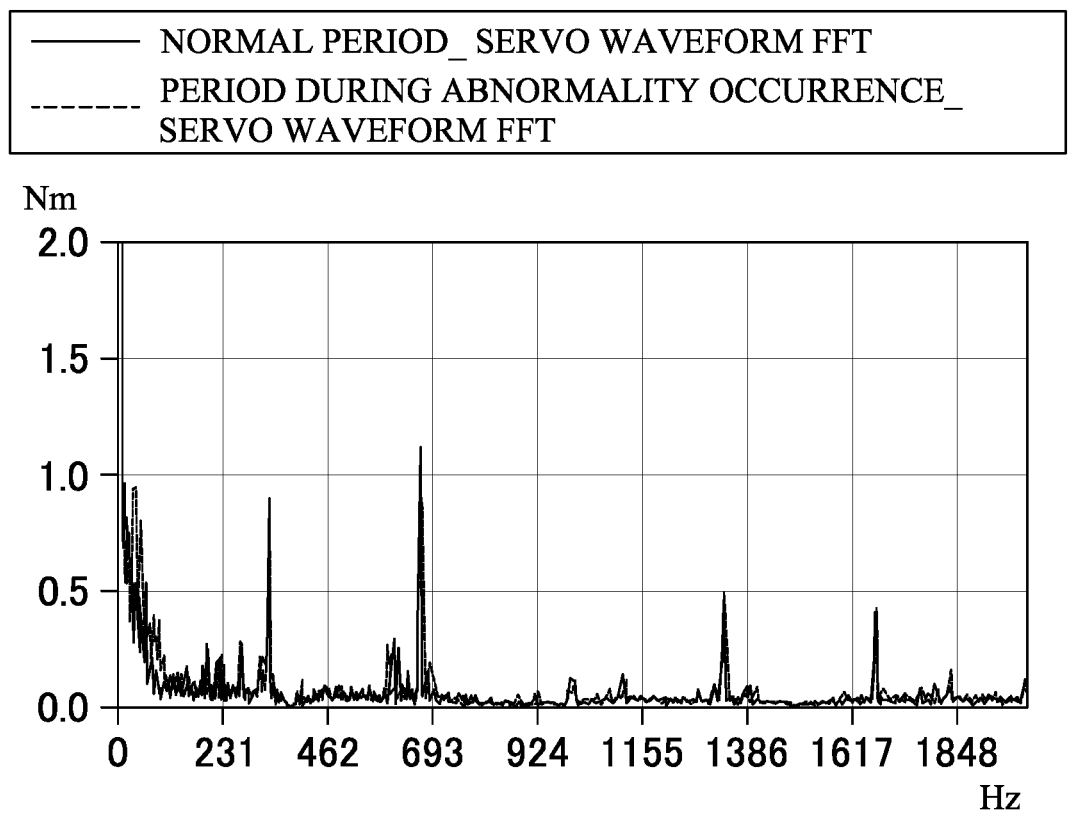
FIG. 7 is a view illustrating the FFT analysis result of a torque waveform when the feed velocity Fg is 20000 [mm/min].

For example, FIG. 5 illustrates the damage frequencies of the bearing when the feed velocity Fg is 7500 [mm/min] and when the feed velocity Fg is 20000 [mm/min], and FIG. 6 and FIG. 7 illustrate graphs where the frequency analysis is performed on the torque waveform when the feed velocity Fg is 7500 [mm/min] and when the feed velocity Fg is 20000 [mm/min].

In this feed axis, scratches are present on the inner race and the outer race of the bearing. When the feed velocity Fg is 7500 [mm/min], the peaks are present at 87 Hz and 100 Hz, and the damage on the inner and outer races of the incorporated bearing can be detected. However, when the feed velocity Fg is 20000 [mm/min], since the damage frequencies of the inner and outer races of the bearing are 231 Hz and 268 Hz, and exceed 200 Hz that is an upper limit of the frequency band having the good responsiveness, it is known that the peak is not confirmed.

Therefore, the feed velocity Fg calculated here is 7500 [mm/min].

However, even in the normal feed axis, by influence of vibration in the operation of the machine, vibration of disturbance, and the like, as a result of the frequency analysis of the torque waveform, the peak is sometimes present. There is also a case where change of peak values in the normal period and the diagnostic period becomes hard to know when this peak overlaps the damage frequency.

To deal with such a case to enhance detection accuracy of the abnormality, it is only necessary that the feed velocity calculator 24 calculates a plurality of feed velocities Fg where a relationship between the respective feed velocities will be a non-integral multiple, in addition to the feed velocity Fg with 7500 [mm/min] calculated at S13. For example, in a case based on Fg with 7500 [mm/min], in addition to Fg with 7500 [mm/min], 4500 [mm/min] that will be 0.6 times of this, and 10500 [mm/min] that will be 1.4 times of this are set as the feed velocities Fg. Since the vibration by the machine operation and the vibration of the disturbance do not vary by the feed velocity, state grasping separated from the damage of the machine components that varies in a proportional relationship to the feed velocity can be easily performed by performing the diagnosis with the plurality of feed velocities that will be the non-integral multiple.

The subsequent process is similar to that in the embodiment 1, the feed axis controller 21 performs the operation of the feed axis 1 with the set plurality of feed velocities Fg at S14 (an axis operation step), and the frequency analyzer 25 performs the frequency analysis on the servo information (the torque waveform) during the axis operation at S15 (a frequency obtaining step).

Then, the determining unit 26 determines whether the peak of the damage frequency is present or not from the respective frequency analysis results at S16 (a determining step). Here, when the peak of the damage frequency is confirmed, it is determined that it is abnormal (the damage is present) at S17, and when the peak of the damage frequency is not confirmed, it is determined that it is normal (the damage is not present) at S18, thus displaying the determination result on the display unit 23.

Here, a display method on the display unit 23 will be described. FIGS. 8A and 8B illustrate a display example of the result when the diagnosis has been performed with the plurality of feed velocities. In FIG. 8A, the horizontal axis is indicated as the frequency, and in FIG. 8B, the horizontal axis is indicated as a frequency ratio with respect to the rotation frequency of the feed axis. The rotation frequency is calculated by the feed velocity/the lead of the ball screw/60, the frequency ratio is calculated by the frequency/the rotation frequency. Both vertical axes show strengths after the frequency analysis, and are offset in a vertical direction so that the plurality of feed velocities are indicated in one graph for convenience.

A marker M1 is an influence by the inner-race damage of the bearing, and while a peak position varies depending on the feed velocity in the graph indicating the frequency in FIG. 8A, there is no variation in the peak position depending on the feed velocity in the graph indicating the frequency ratio with respect to the rotation frequency in FIG. 8B.

A marker M2 is an influence of the vibration by the axis operation, and while there is no variation in the peak position depending on the feed velocity in the graph indicating the frequency in FIG. 8A, the peak position varies depending on the feed velocity in the graph indicating the frequency ratio with respect to the rotation frequency in FIG. 8B.

Thus, after the determining step is performed, the graph indicating the frequency in the horizontal axis and the graph indicating the frequency ratio with respect to the rotation frequency are arranged to be collectively indicated (an indicating step). Then, it can be discriminated whether it is an influence of the damage by the machine component or not, thus facilitating the grasping of the state. Markers corresponding to the damages of the machine components such as the bearing, the ball screw, and the linear guide may be indicated.

Thus, also in the abnormality diagnostic method and device for the feed axis 1 in the above-described embodiment 2, the frequency characteristic of the feed axis 1 and the damage frequency are obtained, the feed velocity Fg that can detect the peak of the damage frequency is calculated from the obtained frequency characteristic, the axis operation is performed on the feed axis 1 with the calculated feed velocity Fg, the frequency analysis is performed on the servo information regarding the control of the servo motor 3 during the axis operation, the presence/absence of the peak of the damage frequency is confirmed from the frequency analysis result, and when the peak is present, it is determined that it is abnormal. Thus, the damage determination of the feed axis such as the bearing, the ball screw, and the linear guide is allowed at low cost without additionally adding the sensor or the like.

In particular, here, since the feed velocity where the maximum value of the damage frequency is included in the frequency band A where the gain becomes the certain value or more in the obtained frequency characteristic is used as the feed velocity Fg, the presence/absence of the peak of the damage frequency can be detected in a short time even when there are a plurality of positions required to be diagnosed.

In the above-described embodiments 1 and 2, the frequency analysis is performed on the torque waveform as the servo information. The similar method can be performed also on the position deviation and the velocity calculated based on displacement information of the position detector. However, the frequency easily detected in the displacement information becomes a frequency lower than that detected in the torque waveform. Therefore, the detection from the torque waveform and the detection from the position deviation are differently used in accordance with the damage frequency required to be detected, for example, such that the frequency is detected from the position deviation when the damage frequency is less than 20 Hz, and the frequency is detected from the torque waveform when the damage frequency is 20 Hz or more. In this way, accuracy in the damage detection can be increased. The predetermined values of these differently used frequencies can be changed as necessary.

In the above-described embodiments 1 and 2, the abnormality diagnostic device is formed in the machine tool to perform the abnormality diagnosis. However, the abnormality diagnosis may be performed such that the frequency characteristic of the feed axis and the damage frequency are stored in an external device such as an outside PC, the servo information during the axis operation is transmitted to the external device by wire or without wires, and the frequency analysis is performed in the external device. That is, the abnormality diagnostic device in the disclosure can be constituted including the machine tool having the feed axis as the diagnostic target and the external device. Thus, when the abnormality diagnostic device is constituted using the external device, there are advantages that the abnormality diagnoses for a plurality of machine tools can be simultaneously performed, and diagnosis data can be also centrally controlled.

Then, the disclosure is applicable to machines insofar as they include the feed axis, not limited to the machine tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. An abnormality diagnostic method for feed axis, in a machine including a feed axis that moves a moving body via a ball screw that rotates by a servo motor, the method performing:
   a frequency obtaining step of obtaining a frequency characteristic of the feed axis and a damage frequency that occurs when the feed axis that has been damaged performs an axis operation;
   a feed velocity calculating step of calculating a feed velocity configured to detect a peak of the damage frequency from the obtained frequency characteristic;
   an axis operation step of performing the axis operation on the feed axis with the calculated feed velocity;
   a frequency analysis step of performing a frequency analysis on servo information regarding a control of the servo motor during the axis operation; and
   a determining step of confirming presence and absence of the peak of the damage frequency from a result of the frequency analysis to determine the abnormality when the peak is present.

2. The abnormality diagnostic method for feed axis according to claim 1, wherein
   in the feed velocity calculating step, as the feed velocity, a feed velocity is calculated such that a frequency where a gain is maximized in the obtained frequency characteristic matches the damage frequency.

3. The abnormality diagnostic method for feed axis according to claim 1, wherein
   in the feed velocity calculating step, as the feed velocity, a feed velocity is calculated such that a maximum value of the damage frequency is included in a frequency band where a gain becomes a certain value or more in the obtained frequency characteristic.

4. The abnormality diagnostic method for feed axis according to claim 3, wherein:
   in the feed velocity calculating step, a feed velocity that has a non-integral multiple relationship with the calculated feed velocity is additionally calculated,
   in the axis operation step, the axis operation is performed on the feed axis with a plurality of the feed velocities,
   in the frequency analysis step, the frequency analysis is performed on the servo information obtained for the respective feed velocities, and
   in the determining step, the presence and absence of the peak of the damage frequency is confirmed from a result of the frequency analysis for the respective feed velocities.

5. The abnormality diagnostic method for feed axis according to claim 4, wherein
   an indicating step that, based on the result of the frequency analysis obtained in the frequency analysis step, creates two kinds of graphs, one of which indicates a frequency and the other indicates a frequency ratio with respect to a rotation frequency of the feed axis, and collectively indicates the result of the frequency analysis for the respective feed velocities is additionally performed.

6. The abnormality diagnostic method for feed axis according to claim 1, wherein
   the servo information on which the frequency analysis is performed in the frequency analysis step is a torque waveform.

7. The abnormality diagnostic method for feed axis according to claim 1, wherein
   the servo information on which the frequency analysis is performed in the frequency analysis step is a position deviation between a position command to the feed axis and a current position of the servo motor when the damage frequency is less than a predetermined value, and is a torque waveform when the damage frequency is the predetermined value or more.

8. An abnormality diagnostic device for feed axis, in a machine including a feed axis that moves a moving body via a ball screw that rotates by a servo motor, the device comprising:
   a storing unit that stores a frequency characteristic of the feed axis and a damage frequency that occurs when the feed axis that has been damaged performs an axis operation;
   a feed velocity calculating unit that calculates a feed velocity configured to detect a peak of the damage frequency from the stored frequency characteristic;
   an axis operation performing unit that performs the axis operation on the feed axis with the calculated feed velocity;
   a frequency analysis unit that performs a frequency analysis on servo information regarding a control of the servo motor during the axis operation; and
   a determining unit that confirms the presence and absence of the peak of the damage frequency from a result of the frequency analysis to determine the abnormality when the peak is present.

* * * * *